(12) United States Patent
Fecht

(10) Patent No.: US 8,583,279 B2
(45) Date of Patent: Nov. 12, 2013

(54) DEVICE AND METHOD FOR HANDLING FLAT OBJECTS, IN PARTICULAR NAPPIES

(75) Inventor: Heino Fecht, Apen (DE)

(73) Assignee: Focke & Co. (GmbH & Co. KG), Verden (DE)

(*) Notice: Subject to any disclaimer, the term of this patent is extended or adjusted under 35 U.S.C. 154(b) by 835 days.

(21) Appl. No.: 12/597,349

(22) PCT Filed: Apr. 29, 2008

(86) PCT No.: PCT/EP2008/003465
§ 371 (c)(1),
(2), (4) Date: Oct. 23, 2009

(87) PCT Pub. No.: WO2008/135201
PCT Pub. Date: Nov. 13, 2008

(65) Prior Publication Data
US 2010/0138035 A1   Jun. 3, 2010

(30) Foreign Application Priority Data
May 3, 2007   (DE) .................... 10 2007 021 146

(51) Int. Cl.
*B65G 43/10* (2006.01)
(52) U.S. Cl.
USPC .............. 700/230; 53/493; 53/443; 198/357; 198/430; 198/347.1; 198/431; 198/460.1
(58) Field of Classification Search
USPC ........................................... 700/230
See application file for complete search history.

(56) References Cited

U.S. PATENT DOCUMENTS

| 4,325,475 A | 4/1982 | Spalding |
| 4,399,905 A * | 8/1983 | Lance et al. ............... 198/430 |

(Continued)

FOREIGN PATENT DOCUMENTS

| DE | 3224329 A1 | 1/1983 |
| DE | 019523752 A1 | 3/1996 |

(Continued)

OTHER PUBLICATIONS

German Search Report issued in corresponding German Application No. 102007021146.7 filed May 3, 2007.

(Continued)

*Primary Examiner* — Gene Crawford
*Assistant Examiner* — Kyle Logan
(74) *Attorney, Agent, or Firm* — Laurence P. Colton; Smith Risley Tempel Santos LLC

(57) ABSTRACT

A method and device for handling flat objects, in particular flat folded diapers (10), which are fed to a conveyor with receptacles for each object or for each diaper (10) by way of a feeder (13, 14), in particular to a compartment conveyor (17) comprising separation struts (22) which are arranged so as to protrude radially from a continuous conveyor (21) in order to form compartments (23) for each object. Provision is made for the speed (v) at which the objects are transported on the feeder (13, 14) to be reduced for handover of the objects to the conveyor. The device includes a database in which respective data records containing transport speeds ($v_x$) for a control unit (34) being filed for different objects and/or objects of different size, the speed of the feeders (13, 14) being regulated by the control unit (34) in accordance with the transport speed (v) pertaining to the respective object.

10 Claims, 6 Drawing Sheets

(56) References Cited

U.S. PATENT DOCUMENTS

| | | | |
|---|---|---|---|
| 5,096,043 A * | 3/1992 | Gorrieri et al. | 198/461.1 |
| 5,097,939 A * | 3/1992 | Shanklin et al. | 198/419.2 |
| 5,611,418 A | 3/1997 | Helmstetter | |
| 5,768,856 A * | 6/1998 | Odenthal | 53/443 |
| 5,897,297 A | 4/1999 | Gerwe | |
| 6,129,199 A * | 10/2000 | Gretener et al. | 198/357 |
| 6,237,741 B1 * | 5/2001 | Guidetti | 198/347.1 |
| 6,408,601 B1 * | 6/2002 | Odenthal et al. | 53/493 |
| 2001/0001997 A1 * | 5/2001 | Ghiotti et al. | 198/431 |
| 2004/0065526 A1 * | 4/2004 | Zeitler | 198/460.1 |

FOREIGN PATENT DOCUMENTS

| | | |
|---|---|---|
| EP | 0101144 A | 2/1984 |
| EP | 0709315 | 5/1996 |
| EP | 0778203 A2 | 6/1997 |
| EP | 0941950 A1 | 9/1999 |
| WO | WO 99/18019 A | 4/1999 |

OTHER PUBLICATIONS

International Search Report issued in corresponding International Application No. PCT/Ep2008/003465 filed on Apr. 29, 2008.

* cited by examiner

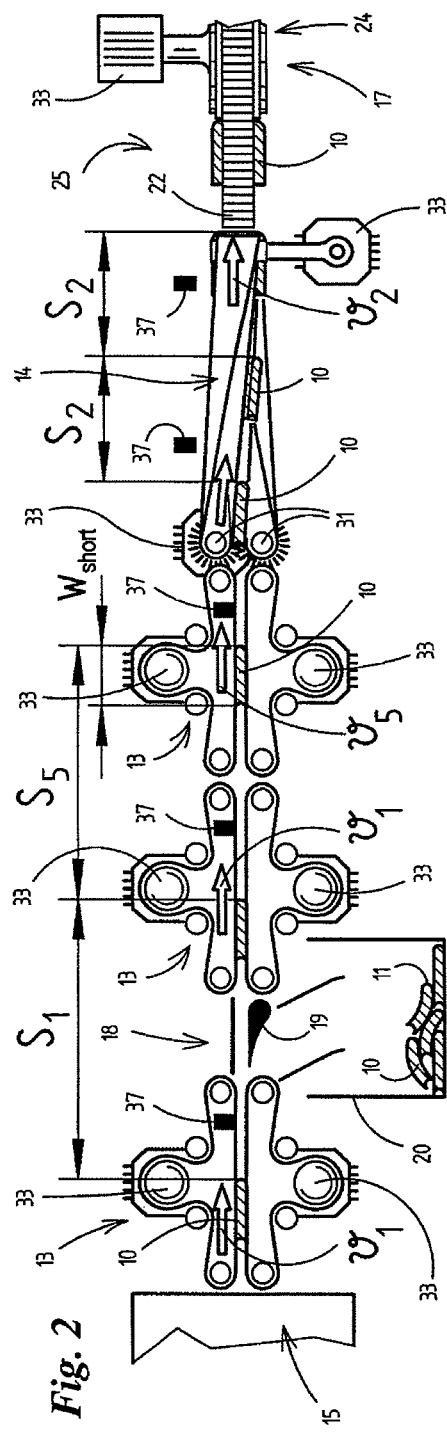
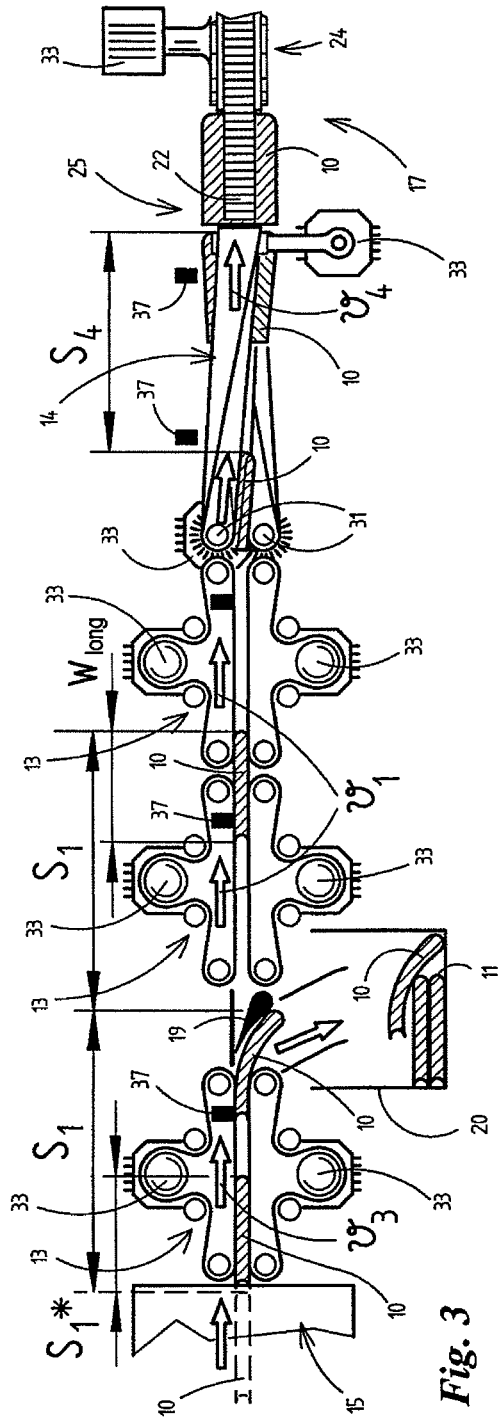
Fig. 2
Fig. 3

DEVICE AND METHOD FOR HANDLING FLAT OBJECTS, IN PARTICULAR NAPPIES

This patent application claims the benefit of Patent Cooperation Treaty International Application No. PCT/EP2008/003465 having an International Filing Date of 29 Apr. 2008, which claims priority on German Patent Application No. 10 2007 021 146.7 having a filing date of 3 May 2007, both of which are incorporated herein in their entireties by this reference.

BACKGROUND OF THE INVENTION

1. Technical Field

The invention relates to a device and a method respectively for handling flat or planar objects, in particular flat folded diapers, which can be successively fed to a conveyor with receptacles for each object or for each diaper, in particular to a compartment conveyor comprising separation struts which are arranged so as to protrude radially from a continuous conveyor in order to form compartments for each object.

2. Prior Art

A compartment band is known as a means for transporting bags in the formation of groups made up of a plurality of bags, for example, from DE 195 23 752. The compartment band can consist of a continuous belt running around, for example, four deflection rollers. Radially protruding struts are arranged on the outside of the belt in order to form the compartments for each receiving a bag. In the region of a collection station, the bags are deposited on a discharge conveyor while forming groups.

Diapers are packaged as preferably folded, flat structures having an, in particular, substantially rectangular or square shape. Each diaper group, made up of a number of diapers placed one on another, forms the content of a (bag) packaging.

The assembly of diaper groups by means of a compartment band is known, for example, from U.S. Pat. No. 5,897,291 (FIG. 1). The diapers are fed, one after another, to the compartment band and are received in intermediate spaces formed between struts of the compartment band. A number of diapers, positioned next to one another in the compartment band, are pushed out by a slide transversely to the orientation of the compartment band and lowered, as a diaper group, on a platform. The platform can be moved upward and hands over the diaper group to a group conveyor which is arranged above the compartment band and transports the diaper groups successively to a packaging machine. This known device is of limited capacity.

BRIEF SUMMARY OF THE INVENTION

The invention is based on the object of developing a method or a device for handling flat objects, in particular diapers, in particular with regard to higher capacity.

In order to achieve this object, the method according to the invention is characterized in that the speed at which the objects are transported on the feeder is reduced for handover of the objects to the conveyor.

This solution has, in particular, the advantage that the objects (diapers) are braked before the handover to the conveyor (compartment band). In this way, the handover and, in particular, the transversely directed discharge of the objects on the conveyor can be carried out more gently. As a result, it is possible overall to increase the power of the device without this leading to damage to the objects during the handover to the conveyor.

According to a preferred development of the invention, provision is made for the objects to be transported via a plurality of feeders arranged one after another, the feeders transporting the objects, at least in part, at different speeds in such a way that the speed of the feeders decreases, at least in part, in the direction of the conveyor. In a preferred embodiment, provision is made for at least the last feeder before the handover of the objects to the conveyor to be operated at a lower speed than at least some of the feeders arranged therebefore.

In a preferred embodiment of the invention, provision is made for defective products to be ejected in the region of the feeders and for the, in part greater, spacing between the objects that is caused by the ejection to be compensated for by the accelerated driving of one or more feeders. In this way, it is possible to compensate for the gap produced as a result of the ejection in order to avoid the absence of individual objects in the packaging.

In a preferred embodiment of the invention, provision is made for the objects to be transported on the feeders at a spacing from one another. This spacing is required in order to be able to introduce the objects into the compartments of the conveyor. Preferably, the spacings of the successive objects are detected in the region of the feeders by means of sensors, in particular light barriers, and defective spacings are if appropriate compensated for by way of accelerated or decelerated driving of one or more feeders. In this way, a gap produced as a result of the ejection of a defective object can be compensated for.

A further special feature consists in the fact that the spacings of the successive objects can be adapted as a function of the product size, in particular in such a way that the spacings of the successive objects are reduced in the region of the last feeder before the handover to the conveyor. In this way, allowance may be made for the circumstance that the time for introduction into the compartment band is shorter in smaller products.

According to a preferred development of the invention (although this may also be an independent solution to the problem raised at the outset), provision is made for there to be filed, for different objects and/or objects of different size, in each case parameters for controlling the device in a control unit, in particular the speed of the feeders and/or the distribution of the transport speed on the feeders and/or the maximum admissible acceleration values of the objects and/or speed differentials between the feeders and/or the spacing, the control unit controlling the transportation of the objects on the feeders in accordance with the filed parameters. A database is preferably provided, in which respectively optimized parameters are stored for various objects. Preferably, a respective suitable speed is filed at least for each object and for each feeder, so that the required adaptations of the transport speed can be individually regulated over the transport path along the feeders.

A further idea of the invention consists in the fact that the transport speed of the objects on preferably at least the last feeder before the handover of the objects to the compartment conveyor is regulated as a function of the product size, in particular the length of the object in the direction of transportation, the dimensions of a compartment between adjacent separation struts of the compartment conveyor and the conveyance speed of the compartment conveyor, in such a way that larger objects having a higher transport speed and smaller objects having a lower transport speed are transported in order in this way to achieve as gentle as possible a handover of the objects to the compartment band at high capacity of the device as a whole.

According to a preferred development of the invention, provision is made for the spacing between two successive objects to be controlled in such a way that the spacing is just sufficient for a separation strut of the compartment conveyor to be moved through, after the introduction of one object and before the introduction of the next object, between the two objects. Furthermore, provision may be made for the introduction of an object into a compartment of the compartment conveyor to begin as soon as a leading end of the object touches a notional virtual envelope curve which is described by free ends of the separation struts of the compartment conveyor in the region of the filling station and for the introduction of the object into the compartment of the compartment conveyor to end as soon as a downstream end of the object has passed through the notional virtual envelope curve. In this way, the introduction process can be optimally shortened.

Further measures for as gentle as possible treatment of the objects consist in the fact that the speed differential between adjacent feeders is selected in such a way that the objects are not damaged during the handover between the feeders, wherein the smaller the objects are, the higher is the speed differential between adjacent feeders and the larger the objects are, the lower is the speed differential.

A device for achieving the object mentioned at the outset is a device for handling flat objects, in particular flat folded diapers, which can be fed to a conveyor with receptacles for each object or for each diaper by way of a feeder, in particular to a compartment conveyor comprising separation struts which are arranged so as to protrude radially from a continuous conveyor in order to form compartments for each object, characterized in that the speed at which the objects are transported on the feeder can be reduced for handover of the objects to the conveyor.

According to a preferred development of the invention, provision is made for the last feeder, in particular a twist band, before the handover of the objects to the conveyor to have a plurality of, in particular two, light barriers for detecting the spacings of the objects in this region. This allows more precise detection of the spacings of the objects in this critical region and if appropriate targeted intervention for adapting the spacings.

Further details and advantageous embodiments of the invention are contained in the sub-claims, the drawings and the remainder of the description.

BRIEF DESCRIPTION OF THE DRAWINGS

A preferred exemplary embodiment of the invention will be described hereinafter with reference to the drawings, in which:

FIG. 2 is a side view of the device according to FIG. 1 in the direction indicated by arrow II in FIG. 1 during manufacture of a shorter object;

FIG. 3 is a side view of the device according to FIG. 1 in the direction indicated by arrow III in FIG. 1 during manufacture of a longer object;

DETAILED DESCRIPTION OF PREFERRED EMBODIMENTS

Figure 1:
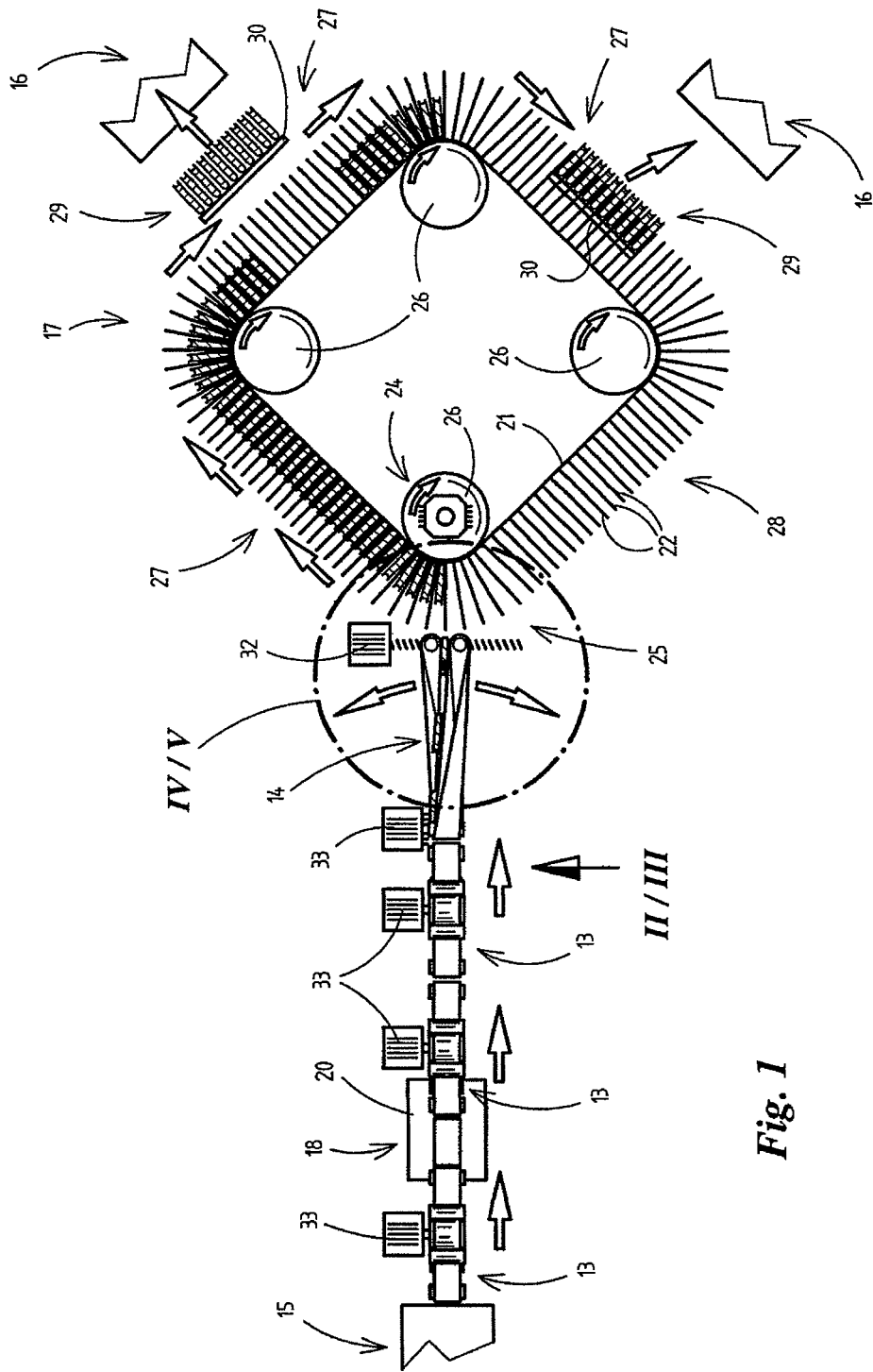
FIG. 1 is a schematic outline of a device for handling objects, in particular diapers.

The exemplary embodiments in the drawings are concerned with the handling of diapers 10. These are comparatively flat, approximately rectangular structures which are produced by folding while forming two legs of equal size. A rounded folding edge 11 is arranged pointing predominantly forward in the direction of conveyance. Instead of diapers 10, it is possible to process in the same way flat objects of similar size and shape, in particular books, magazines, (bag) packs, etc.

The diapers 10, which are fed individually from a manufacturing machine 15 (convector) or from a store, are intended to be assembled to form groups, i.e. diaper groups. Each diaper group corresponds to the content of a pack to be produced. The diaper groups are accordingly fed to one or more packaging machines 16. The unit provided in the present case, which is designated as a whole as a grouping means 12, forms a handling station between the manufacturing machine 15 and the packer 16.

The grouping means 12 adjoins feeders 13, 14 which feed individual diapers, one after another in the longitudinal direction, from the manufacturing machine 15. In its basic construction, the grouping means 12 consists of at least one compartment conveyor 17 following the feeder 14. Each diaper group consists of diapers 10 positioned upright tight against one another. The diapers 10 are fed at the spacing S from one another.

The compartment conveyor 17 consists of a continuous conveyor or a compartment belt 21, to the outside of which separating members forming compartments 23, that is to say, separation struts 22, are attached. The separation struts are directed at an acute angle to the plane of the compartment belt 21 and protrude radially therefrom. There are thus produced in the region of rectilinear conveyance portions narrow receptacles for each diaper 10, that is to say, compartments 23. The separation struts 22 are attached to the compartment belt 21 in a fixed relative position. In the region of a deformation of the compartment belt 21, in particular in the region of a deflector 24, the separation struts 22 are spread, so that the compartments 23 form in this region a wedge-shaped cross section diverging outward, toward the free side.

The objects or diapers 10 are inserted, in the region of the deflector 24 of the compartment conveyor 17, into the compartments 23 by way of the feeder 14, that is to say, in a filling station 25. The compartment conveyor 17 is guided in the horizontal plane so as to run around a plurality of deflection rolls 26. The compartment conveyor 17 runs in this regard, in the present case, over four deflection rolls 26 while forming a rectangular formation. The diapers 10 are inserted into the compartments 23 in the region of the first deflection roll 26 which is embodied as a drive roll. There follow a first conveyance portion 27 and, following the second deflection roll 26, a second conveyance portion 27. After further deflection there follows a third conveyance portion 27 whereupon, after a further deflector, the compartment conveyor 17 forms an empty portion 28.

Following the filling station 25, each compartment 23 is occupied by an object or a diaper 10. There follows a first collection station 29 in which a first group of diapers 10 is removed from the compartment conveyor 17. This collection station 29 is located in the region of the second conveyance portion 27. A second collection station 29 is associated with the subsequent third conveyance portion 27. Here, a second group of the diapers 10 is removed while completely emptying the compartment conveyor 17.

A removal or push-out member 30, which is embodied in such a way that only the number of diapers 10 required to form the group are pushed out, is associated with each collection station 29. The diapers 10 following on (in the collection station 29) are transported through the first collection station 29 to the second collection station 29.

The feeders 13, 14 for transporting the diapers 10 to the grouping unit are embodied as a belt conveyor or as a continuous belt and arranged in such a way that in each case two mutually associated belts transport the diapers 10 between adjacent conveyance strands.

In the exemplary embodiment according to FIG. 1, the diapers 10 are fed to the compartment conveyor 17 by way of the feeder 14. The compartment conveyor ends directly in the region of the grouping unit, that is to say, on the transversely directed compartment conveyor 17. The feeder 14 is in this case embodied as a turning conveyor or as a twist belt. Deflection rollers 31 of the feeder 14 are provided with axes of rotation offset by 90°. The arriving diapers 10 are taken over in the horizontal plane and turned, during the transportation through the feeder 14, through 90° into an upright position.

As a further special feature, the twist belt (feeder 14) can be pivoted by a drive 32 in the horizontal plane in order to follow the conveyance movement of the separation struts 22 or the compartments 23 for a trouble-free handover of the diapers 10 even in the event of non-uniform spacings $S_x$ during feeding thereof. The drive 32 for the pivoting movements of the feeder 14 is a spindle driven by a servo motor. The movement of the feeder 14 is adapted to the movements of the deflection roll 24 of the compartment feeder 17 as a function of the feeding of the diapers 10.

Furthermore, an ejection station 18 for diapers 10 is formed between the feeders 13 and the twist belt (feeder 14). An adjustable guide member 19 can, when positioned appropriately, discharge individual diapers 10, in particular defective products, downward into a collection container 20.

A special feature of the described device consists in the fact that the transport speed v of the diapers 10 is reduced for the handover to the compartment conveyor 17.

Manufacturing machines 15 currently known from practical experience are able to produce about 1,000 diapers per minute, the diapers being transported at a spacing S of 550 mm on the feeders 13, 14. This results in a transport speed $v_1$ of 550 m/min. In the adjoining compartment conveyor 17, the diapers 10 are discharged transversely. This has the consequence that the original transport speed v of the diapers 10 is braked to zero in the longitudinal direction of the feeders 13, 14. In this case, considerable forces act on the diapers 10, which forces can lead to shifting of the granules in the diapers 10 and to damage of the products.

With the aid of the reduction of the transport speed v of the diapers 10 during transportation on the feeders 13, 14, it is possible to reduce the speed v of the diapers 10 gently in order to avoid damage or to allow an increase in the working speed of the device. In this way, it will in the future also be possible to use manufacturing machines 15 having a higher output, for example of 1,400 diapers per minute. Under normal circumstances, the energy to be absorbed would, during the introduction of the diapers 10 into the compartment conveyor 17, be doubled as a result of the accompanying higher transport speed v. However, with the aid of the reduction of the transport speed v, this can be compensated for, at least in part.

As may be seen from FIGS. 1 to 3, in the present case a plurality of feeders 13, 14 are arranged in succession. The transport speed v of the diapers 10 is in this case reduced, at least in the last feeder 14 before the handover of the diapers 10 to the compartment conveyor 17. The last feeder 14 is in the present case a twist band. It can however also be a further "normal" feeder 13.

The transport speed v of the diapers 10 is reduced as a result of the fact that the last feeder 14 is driven at a lower speed v than the feeders 13 arranged therebefore. For this purpose, the belts of each feeder 13, 14 can be controlled by regulatable drives 33. These drives 33 are preferably servo motors. Each feeder 13, 14 has two drives 33, which can be activated in synchronization, for each belt. The activation is carried out with the aid of a controller, for example an SPC. The controller can be embodied by an electronic control unit 34 which is connected to the drives 33 in each case via signal lines 35.

Figure 6:
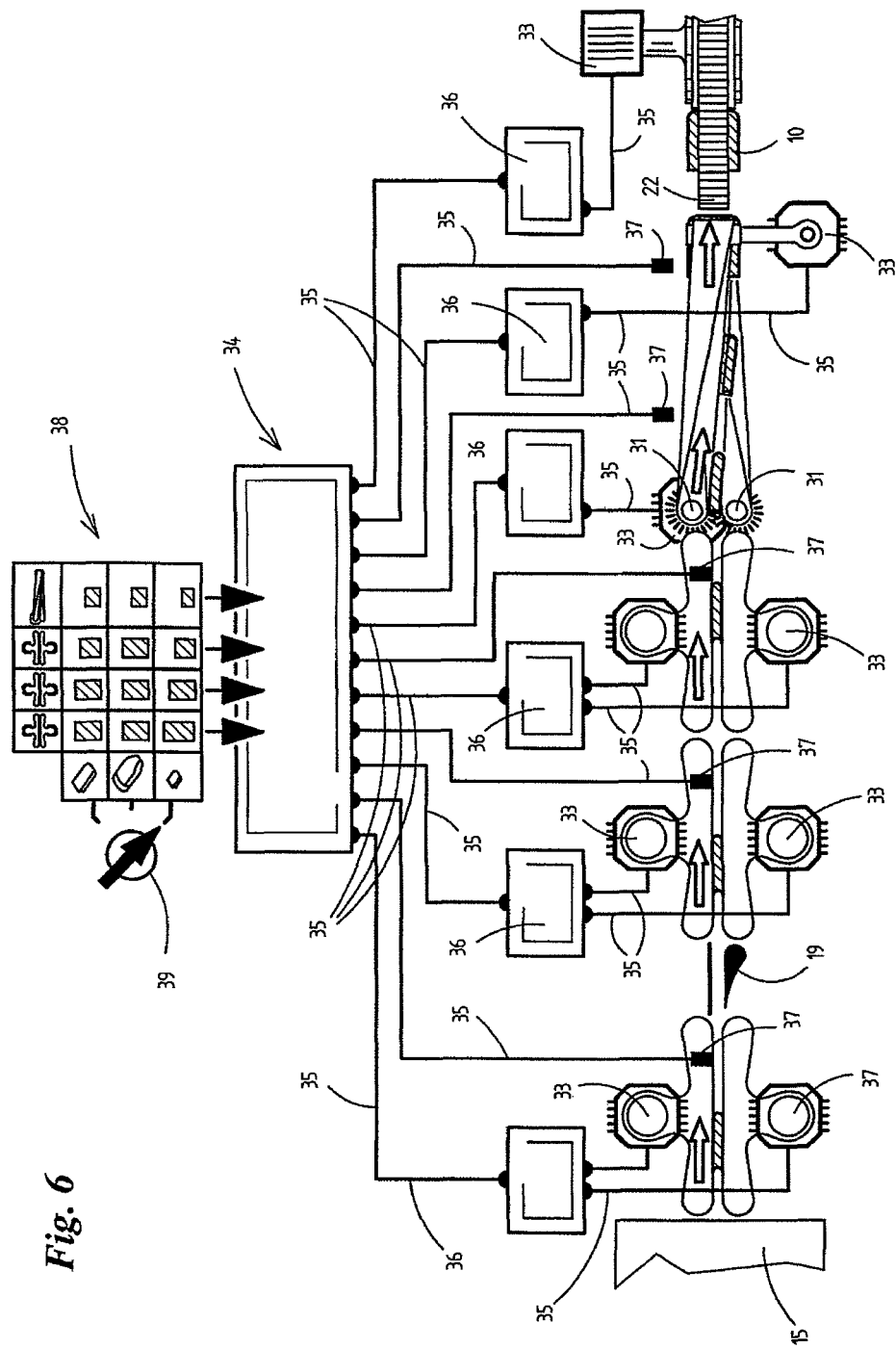
FIG. 6 is a schematic illustration of the device according to FIG. 1.

The speed of the drives 33 can, as shown in FIG. 6, be regulated as a result of the fact that the power supply 36 for each pair of the drives 33 is regulated via the signal lines 35. For the purposes of monitoring, there is associated with each feeder 13, 14 a light barrier 37 which can be used to detect the spacings $S_x$ between the diapers 10 in these regions. The light barriers 37 are also connected to the control unit 34 via signal lines 35.

The device described hereinbefore operates, as shown in FIG. 2, in a simplified manner as follows: the diapers 10 are handed over by the converter (manufacturing machine 15), arriving at the first feeder 13, and transported there at a speed $v_1$ in the direction of the compartment feeder 17. In this case, the diapers 10 are at a spacing $S_1$. Adherence to the spacing $S_1$ is monitored with the aid of the light barriers 37. The speed of the diapers 10 is reduced to $v_2$, at least on the twist band (feeder 14). This is carried out as a result of the fact that the twist band is driven at a lower speed than the feeders 13. The speed is filed in the control unit 34. As a result of the different speed of the feeders 13, 14, the diapers 10 are slightly stacked up during the handover, so that the spacing of the diapers is reduced to $S_2$. At this spacing $S_2$ and a speed $v_2$, the diapers are then introduced into a compartment 23 between the separation struts 22 of the compartment conveyor 17.

As the two feeders 13, 14 are driven at different speeds, this leads to loading of the diapers 10 during the handover. In the present case, the speed differential between the feeder 13 and the slower feeder 14 leads to the diapers 10 being crumpled for a short time during the handover. For this reason, maximum speed differentials between the conveyors 13, 14 can also be defined, in addition to other parameters, in the control unit 34, so that the loading does not become too great for the diapers 10 during the handover between the conveyors 13, 14 and the diapers 10 are not damaged or even destroyed.

In addition, different maximum speed differentials are filed in the control unit 34 for different diapers 10. It was recognized that, for example in the case of shorter diapers 10, the speed differentials may be greater, as shorter diapers require a shorter handover time.

Figures 4, 5:
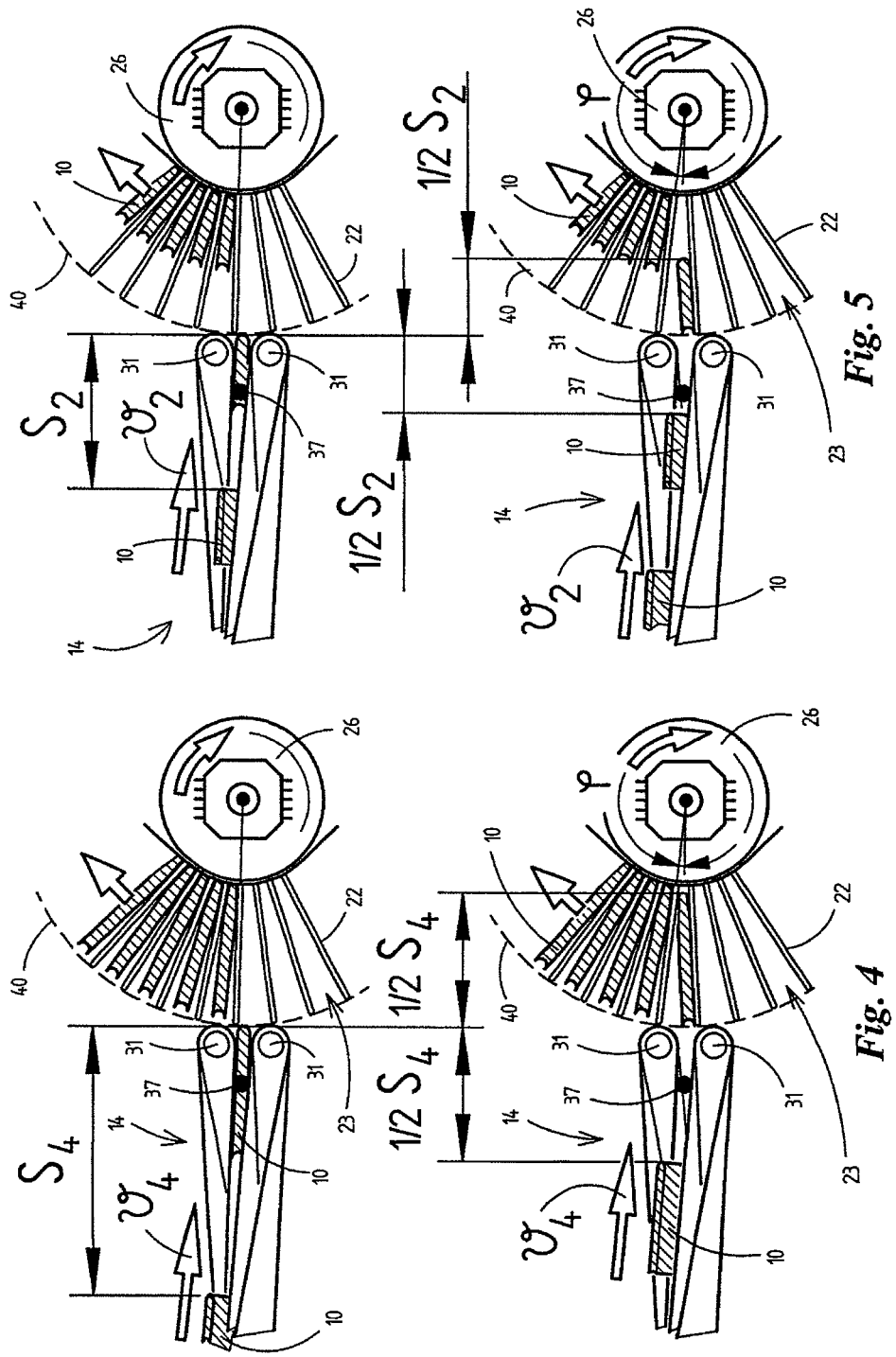
FIG. 4 shows a detail IV of the device according to FIG. 1 during the handover of shorter objects to a conveyor in different phases.
FIG. 5 shows a detail V of the device according to FIG. 1 during the handover of longer objects to a conveyor in different phases.

The angle between the oblique separation struts 22 of the compartment conveyor 17 in the region of the deflector 24 is approximately 2*$\phi$ (FIGS. 4 and 5). The time available for introducing the diaper 10 into a compartment 23 of the continuously revolving compartment conveyor 17 is obtained from the angle $\phi$, the length $W_x$ of the diaper 10 and the transport speed $v_x$ in relation to the speed of the compartment conveyor 17, which is assumed to be constant. The diapers 10 can be introduced into a compartment 23 only in the region of the angle φ, as the separation struts 22 then clear an opening region of the compartment 23.

FIGS. 2 and 5 show the mode of operation of the device for a short diaper 10 having a length $W_{short}$. FIGS. 3 and 4 show the same solution for a long diaper 10 having a length $W_{long}$. In this case, the diaper 10 is first transported at a spacing $S_1$ and a speed $v_3$ and later handed over to the compartment conveyor 17 at a spacing $S_4$ and a speed $v_4$.

Preferably, the transport speed v of the diapers 10 is reduced not only in the region of the last feeder 14 (twist band), but already on the preceding feeders 13. This is also already shown in FIGS. 2 and 3, the diapers 10 being transported in FIG. 2 on the third feeder 13 at a speed $v_5$ which is lower than the speed $v_1$, but still higher than the speed $v_2$.

Figure 7:
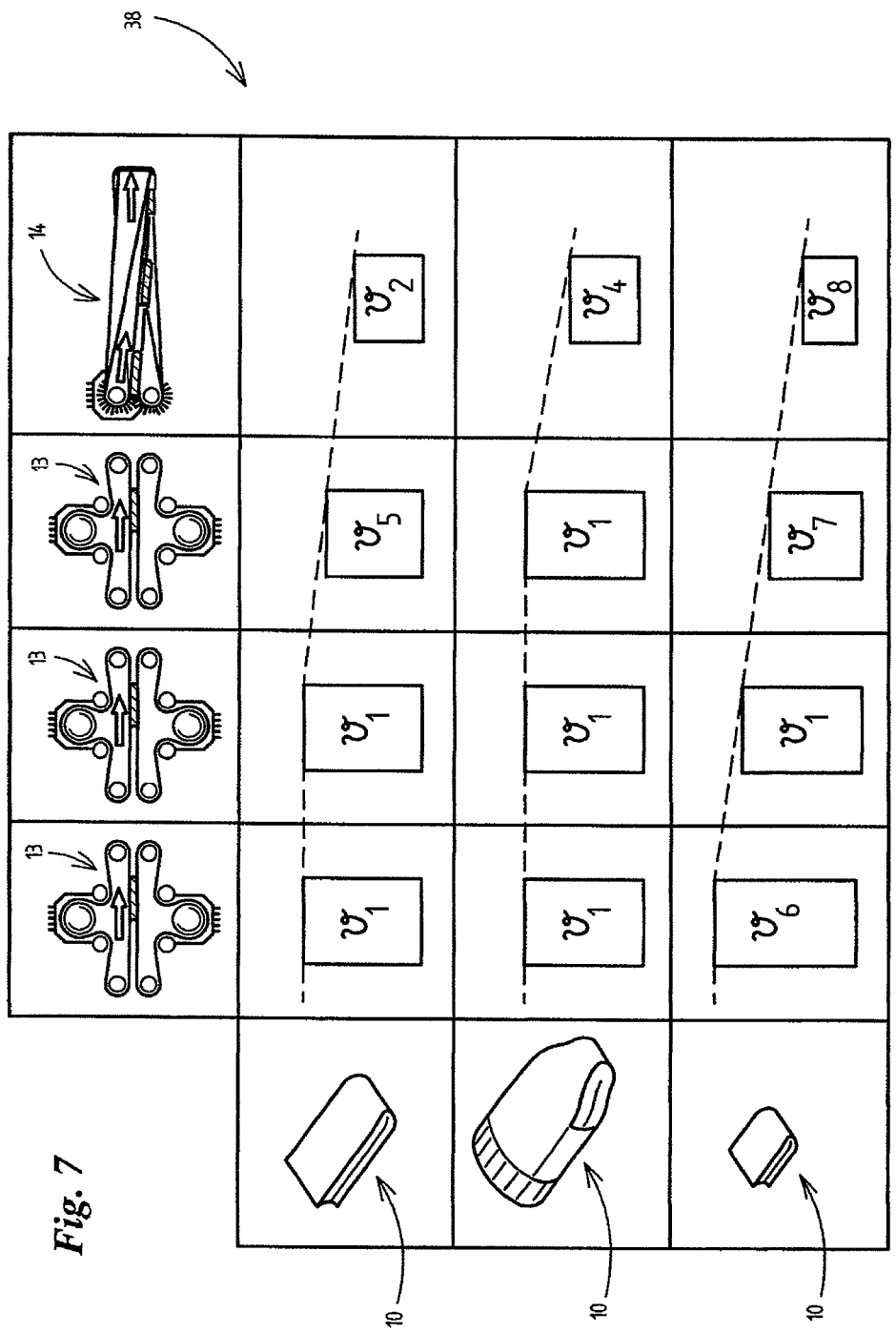
FIG. 7 is a schematic illustration of a database containing information for controlling the device according to FIG. 1.

In contradistinction thereto, in the solution according to FIG. 3, the speed v of the diapers 10 is not normally reduced to $v_4$ until the feeder 14 (FIG. 7). FIG. 3 shows additionally the closing of a gap in the conveyance flow of the diapers 10, merely the first feeder 13 being driven at a higher speed $v_3$.

Normally, the speed v of the diapers 10 is constant throughout the transportation on a feeder 13, 14, provided that the spacings $S_x$ between successive diapers 10 are correct. It is however also conceivable for the speed to be able to be varied in order to adapt spacings between successive diapers 10. This method is preferably suitable if only one diaper 10 is conveyed on each conveyor 13, 14 at any given time.

A further special feature consists, with regard to the handover of the diapers 10 to the compartments 23 between the separation struts 22 of the compartment conveyor 17, in the filling station 25. This special feature is also shown in FIGS. 4 and 5.

The free ends of the separation struts 22 describe a notional envelope curve 40 which is illustrated in FIGS. 4 and 5 by a broken line. The introduction of the diapers 10 into the compartments 23 begins when the start, that is to say, the front folding edge 11, of the diaper 10 touches the envelope curve 40 and the separation strut 22 advancing in the direction of conveyance clears the opening between the two conveyance strands of the feeder 14. This moment is illustrated in the upper part of each of FIGS. 4 and 5. In contradistinction thereto, the lower part of FIGS. 4 and 5 shows in each case the end of the introduction of the diapers 10. This moment is reached once the trailing end of the respective diaper 10 has just passed through the envelope curve 40 and the next separation strut 22 is just entering the opening between the two conveyance strands of the feeder 14.

A further special feature consists in the fact that the spacing S between successive diapers 10 is of precisely the size that, at a constant transport speed v of the diapers 10, the compartment conveyor 17 was moved further exactly in the compartment 23 and the next diaper 10 has reached the introduction position as shown in the upper part of FIGS. 4 and 5. This can be achieved by defining appropriate transport speeds and/or speed differentials between the feeders 13, 14.

In order to be able to regulate the reduction of the speed v of the diapers 10 on the feeders 13, 14 as conveniently as possible, a further special feature consists in the fact that respective transport speeds $v_x$ can be filed for different products in a database 38.

The control unit 34 draws on the transport speeds $v_x$ filed in the database 38 for each product and each feeder 13, 14 and controls the power supply 36 for the feeders 13, 14 via the signal lines 35 in such a way that the feeders are driven at the transport speeds $v_x$ filed in the database 38.

In the database 38, transport speeds $v_x$ for three products are, as shown in FIG. 7, filed in a table, that is to say, in rows, in each case from top to bottom, for medium diapers 10, long diapers 10 and short diapers 10. A respective transport speed v on the first feeder 13, the second feeder 13, the third feeder 13 and the fourth feeder 14 (twist band) may be inferred from each product by way of the columns.

In a preferred embodiment of the invention, a complete parameter set for the control unit 34 is filed in the database 38. The parameter set contains, preferably for each type of diaper 10, the corresponding speeds $v_x$ and/or the speed distribution and/or the maximum acceleration values and/or the speed differentials and/or the spacings $S_x$ in the respective feeders 13, 14 which are controlled via the control unit 34. The selection of these parameters is down to the user and may be adapted, in particular, to the local conditions, the product and the individual requirements. It is conceivable that more parameters are specified than are actually required, so that the controller controls the system accordingly within the predefined boundary conditions.

The schematic illustration in the database 38 shows that the transport speed v of the diapers 10 decreases step by step in the direction of the compartment conveyor 17. Provided that the spacings $S_x$ between the diapers 10 are correct, the feeders 13 are driven at a constant speed. It is however also conceivable for the speed v of the diapers 10 on the feeders 13, 14 to be constantly reduced in that the drive speed of the feeders 13, 14 is continuously reduced, in each case after the takeover of a diaper 10. Once the diaper 10 has been handed over to the following feeder 13, 14, the drive speed would then have to be increased again in order to receive the next diaper 10.

It may also be seen that the transport speed v of the long diapers 10 is not reduced until the last feeder 14, whereas the transport speed v of the medium diapers 10 is already reduced successively from the third feeder 13, and the transport speed v of the short diapers 10 is already reduced successively from the second feeder 13.

It may also be seen that the longer the diapers 10 are, the higher is the speed v which the diapers 10 display on handover to the compartment conveyor 17. This is due to the fact that a longer diaper 10 requires more time to enter a compartment 23 than a shorter diaper 10. This has to be compensated for, at a constant speed v of the compartment conveyor 17, by higher transport speeds $v_x$ of the longer diapers 10.

The product, and thus the transport speeds $v_x$, can be selected either by an operator, who makes an appropriate selection by means of a positioning of a regulator 39, or automatically by way of sensors (not shown) which scan and detect the diapers 10 and cause an automatic selection of the transport speeds $v_x$.

When a new type of diaper 10, for which no parameter set yet exists in the database 38, is processed or handled on the device, the control unit 34 can first generate a parameter set based on properties of the diaper 10. With regard to the properties of the diaper 10, length, thickness, sensitivity, surface composition and internal construction are of particular interest, because default settings for the parameter set can be obtained therefrom. In order to be able to determine the parameter set of a new type of diaper 10, the control unit 34 can draw on the parameter sets of other, in particular similar, diapers 10 and derive therefrom, for example by interpolation, a suitable parameter set. The parameter set thus derived can be optimized by automatic and/or manual corrections during and/or outside operation of the device. After conclusion of the optimization, the new parameter set is then stored in the database 38.

A further special feature of the device consists in the fact that the control unit 34 and the light barriers 37 can be used to detect the spacings S between the diapers 10 and to carry out correction in the event of deviations. For this purpose, individual feeders 13, 14 are purposefully and intermittently driven at a modified speed until the desired spacing is reproduced. The success of this intervention can be monitored by way of the light barriers 37 with the aid of the control unit 34.

A gap, i.e. a relatively large spacing S between the diapers 10, is regularly produced when a defective diaper 10 is ejected in the region of the ejection station 18. This problem is illustrated in FIG. 3. The ejection of a defective diaper 10 would produce a spacing of 2*$S_1$. This gap must be closed before the handover of the diapers 10 to the compartment conveyor 17, because otherwise the diaper group is incomplete.

This gap could be purposefully closed as a result of the fact that the second and if appropriate also the third and fourth feeders 13, 14 are intermittently driven at a lower speed. However, preferably, the first feeder 13 is driven at a higher speed. In the present case, the gap is compensated for as a result of the fact that the gap is shortened by the amount $S_1$* in that the first feeder 13 is intermittently driven at a higher speed $v_3$.

A further special feature consists in the fact that two light barriers 37 are provided in the last feeder 14 (twist band). The light barriers 37 are arranged set apart from each other, that is to say, in the region of the beginning of the feeder 14 and in the region of the end thereof. This allows more accurate detection of defective spacings S between the diapers 10 or of defective positions of the diapers 10 in relation to the position of the separation struts 22 of the compartment conveyor 17. Such errors can occur especially when relatively large gaps occur in the conveyance flow of the diapers 10, for example because a relatively large number of products had to be ejected owing to errors and the gap thus produced cannot be completely compensated for by way of the feeders 13, 14. The errors thus detected with regard to the positioning of the diapers 10 in the twist band can be compensated for with the aid of the drive 32 by way of a resetting movement of the twist band by pivoting in the filling station 25.

Figure 8:
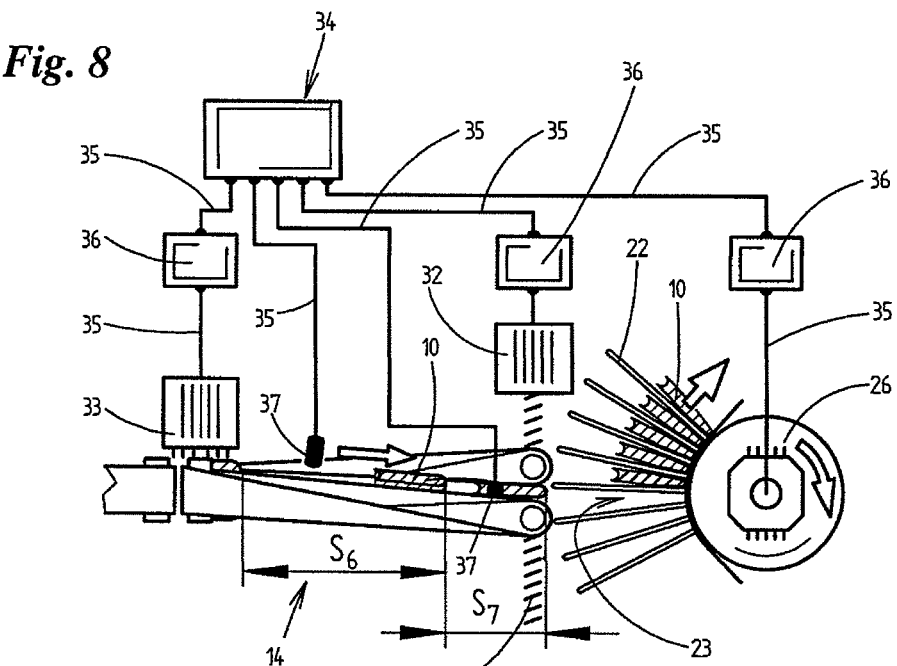
FIG. 8 to FIG. 10 show the handover of objects to a compartment conveyor with an additional possibility for compensating for non-uniform spacings between the objects.
Figure 9:
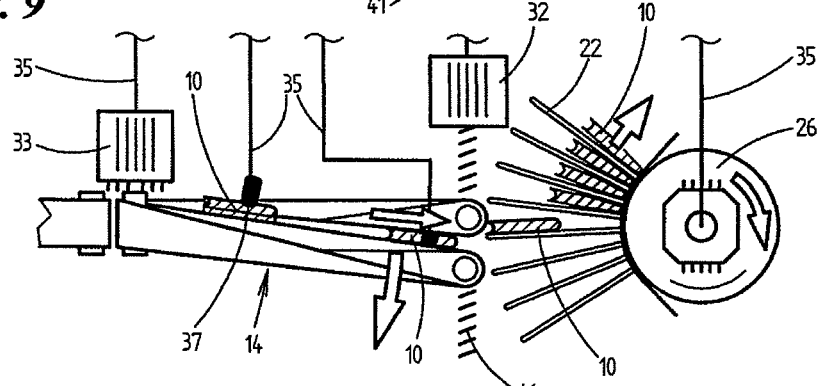
Figure 10:
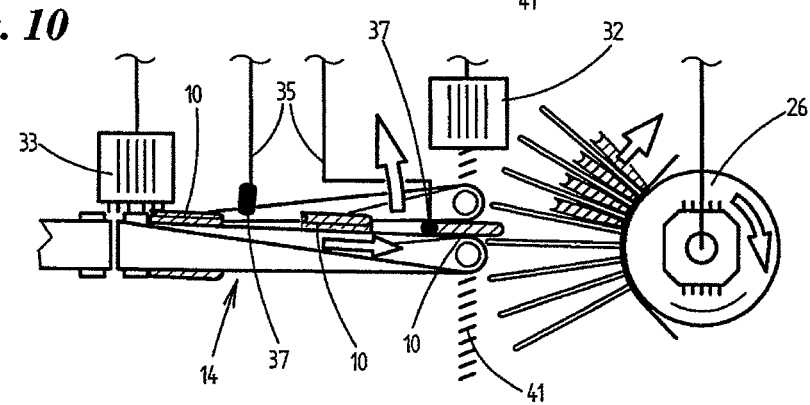

The resetting movement of the twist band is also shown, by way of illustration, in FIGS. 8 to 10. The control unit 34 is connected to the power supplies 36 of the individual drives 32, 33 via signal lines 35 and also to a light barrier 37 in the region of the twist band. The spacings between successive diapers 10 can be determined with the aid of the light barrier 37.

FIG. 8 shows the case in which the spacing $S_7$ between a first and a second diaper is smaller than the desired spacing and in which the spacing $S_6$ between the second and a subsequent third diaper 10 is too large. Unless corrective action is taken on the control of the twist band, such mispositioning of the diapers 10 inevitably leads to problems on introduction of the diapers into the compartment belt 21.

Alternatively or additionally to the above-described variation of the transport speed of the twist band, the end of the twist band can be adjusted with the aid of the drive 32 by coupling to a spindle 41 which can be rotated accordingly by the drive 32. In order to compensate for the excessively short spacing $S_7$, the end of the twist band is pivoted in such a way that that it is moved counter to the compartment 23 to be filled (FIG. 9). Afterwards, the twist band is rotated in the opposite direction in order to compensate for the excessively large spacing $S_6$ (FIG. 10). In the case of correct spacings between successive products, the twist band remains in the position shown in FIG. 8.

Defective spacings between diapers 10 can be corrected both with the aid of the resetting movement of the twist band and by adapted conveyance speeds of the twist band. Spacings which are not caused by the complete absence of one or more successive diapers 10, i.e. are comparatively small, can, in particular, be corrected with the aid of the resetting of the twist band. This is a particular advantage of the resetting movement.

In individual cases, it may be appropriate to use both correction methods (resetting of the twist band and changing the conveyance speed of the twist band) jointly in order to compensate for relatively large differences.

As described hereinbefore, the transport speed v of the diapers 10 during the handover to the compartments 23 of the compartment conveyor 13 depends, in particular, on the length of the diapers 10. In the case of long diapers 10 of, for example, 200 mm and a throughput of 1,000 diapers per minute, the speed $v_4$ is about 440 m/min. If the diapers 10 are on the other hand short, i.e. about 160 mm long, the speed $v_2$ is about 320 m/min.

| List of reference numerals | |
|---|---|
| 10 | Diaper |
| 11 | Folding edge |
| 12 | Grouping means |
| 13 | Feeder |
| 14 | Feeder |
| 15 | Manufacturing machine |
| 16 | Packaging machine |
| 17 | Compartment feeder |
| 18 | Ejection station |
| 19 | Guide member |
| 20 | Collection container |
| 21 | Compartment belt |
| 22 | Separation strut |
| 23 | Compartment |
| 24 | Deflector |
| 25 | Filling station |
| 26 | Deflection roll |
| 27 | Conveyance portion |
| 28 | Empty portion |
| 29 | Collection station |
| 30 | Push-out member |
| 31 | Deflection roller |
| 32 | Drive |
| 33 | Drive |
| 34 | Control unit |
| 35 | Signal line |
| 36 | Power supply |
| 37 | Light barrier |
| 38 | Database |
| 39 | Regulator |
| 40 | Envelope curve |
| 41 | Spindle |
| S | Spacing |
| v | Speed |

What is claimed is:

1. A method for handling flat objects which are fed to a conveyor with receptacles for each object by way of a feeder (13, 14), the conveyor being a compartment conveyor (17) comprising separation struts (22) which are arranged so as to protrude radially from a continuous conveyor (21) in order to form compartments (23) for each object, comprising the steps of:
   (a) transporting the objects on the feeder (13, 14) at a speed (v);
   (b) reducing the speed (v) for handover of the objects to the conveyor; and
   (c) pivoting the last feeder (14) before the handover of the objects to the conveyor to compensate for non-uniform spacings (S) between successive objects in such a way that, in the event of excessively small spacings (S) between successive objects, the feeder (14) is moved counter to the compartment (23) to be filled of the compartment conveyor (17) and that, in the event of excessively large spacings (S) between successive objects, the feeder (14) is moved so as to follow the compartment (24) to be filled of the compartment conveyor (17), this being carried out in each case in accordance with the detected spacings (S) between successive objects.

2. The method as claimed in claim 1, further comprising transporting the objects via a plurality of the feeders (13, 14) arranged one after another, the feeders (13, 14) transporting the objects, at least in part, at different speeds (v) in such a way that the speed (v) of the feeders (13, 14) decreases, at least in part, in the direction of the conveyor (17) in such a way that at least the last feeder (14) before the handover of the objects to the conveyor is operated at a lower speed (v) than at least some of the feeders (13) arranged therebefore.

3. The method as claimed in claim 1, further comprising filing, for different objects and/or objects of different size, in each case parameters for controlling the device in a control unit (34), the parameters being selected from the group consisting of the speed of the feeders (13, 14), the distribution of the transport speed (v) on the feeders (13, 14), the maximum admissible acceleration values of the objects, speed differentials between the feeders (13, 14), the spacing (S), and combinations thereof,
wherein the control unit (34) controls the transportation of the objects on the feeders (13, 14) in accordance with the filed parameters.

4. The method as claimed in claim 1, further comprising selecting the speed differential between adjacent feeders (13, 14) in such a way that the objects are not damaged during the handover between the feeders (13, 14),
wherein the smaller the objects are, the higher is the speed differential between adjacent feeders (13, 14) and the larger the objects are, the lower is the speed differential, and in that the objects are handed over from the feeder (13, 14) to the conveyor which discharges the objects in an antiparallel transverse manner to the direction of transportation on the last feeder (14), and in that the feeder continuously discharges the objects at constant speed (v).

5. The method as claimed in claim 1, wherein the objects are diapers.

6. The method as claimed in claim 1, wherein the sensors are light barriers (37).

7. The method as claimed in claim 1, further comprising regulating the transport speed (v) of the objects on at least the last feeder (14) before the handover of the objects to the compartment conveyor (17) as a function of the object size, the length of the object in the direction of transportation, the dimensions of a compartment (23) between adjacent separation struts (22) of the compartment conveyor (17), and the conveyance speed of the compartment conveyor (17), in such a way that larger objects having a higher transport speed (v) and smaller objects having a lower transport speed (v) are transported.

8. The method as claimed in claim 7, further comprising beginning the introduction of the object into the compartment (23) of the compartment conveyor (17) as soon as a leading end of the object touches a notional virtual envelope curve (40) which is described by free ends of the separation struts (22) of the compartment conveyor (17) in the region of a filling station (25) and in that the introduction of the object into the compartment (23) of the compartment conveyor (17) ends as soon as a downstream end of the object has passed through the notional virtual envelope curve (40).

9. The method as claimed in claim 7, further comprising controlling the spacing (S) between two successive objects in such a way that the spacing (S) is just sufficient for a separation strut (22) to be moved through, after the introduction of one object and before the introduction of the next object, between the two objects.

10. The method as claimed in claim 9, further comprising beginning the introduction of an object into the compartment (23) of the compartment conveyor (17) as soon as a leading end of the object touches a notional virtual envelope curve (40) which is described by free ends of the separation struts (22) of the compartment conveyor (17) in the region of the filling station (25) and in that the introduction of the object into the compartment (23) of the compartment conveyor (17) ends as soon as a downstream end of the object has passed through the notional virtual envelope curve (40).

\* \* \* \* \*